United States Patent
Akazawa et al.

(10) Patent No.: US 9,691,552 B2
(45) Date of Patent: Jun. 27, 2017

(54) ELECTROLYTIC SOLUTION FOR ALUMINUM ELECTROLYTIC CAPACITOR, AND ALUMINUM ELECTROLYTIC CAPACITOR USING SAME

(71) Applicant: SANYO CHEMICAL INDUSTRIES, LTD., Kyoto (JP)

(72) Inventors: Yoshihiko Akazawa, Kyoto (JP); Takashi Katou, Kyoto (JP); Hideo Seike, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 120 days.

(21) Appl. No.: 14/390,396

(22) PCT Filed: Apr. 17, 2013

(86) PCT No.: PCT/JP2013/002606
§ 371 (c)(1),
(2) Date: Oct. 3, 2014

(87) PCT Pub. No.: WO2013/161222
PCT Pub. Date: Oct. 31, 2013

(65) Prior Publication Data
US 2015/0053882 A1 Feb. 26, 2015

(30) Foreign Application Priority Data
Apr. 26, 2012 (JP) ................. 2012-101133

(51) Int. Cl.
*H01G 9/035* (2006.01)
*H01G 9/145* (2006.01)

(52) U.S. Cl.
CPC ............. *H01G 9/035* (2013.01); *H01G 9/145* (2013.01)

(58) Field of Classification Search
CPC ........... H01G 2009/0408; H01G 11/60; H01G 11/62; H01G 11/64; H01G 9/035
See application file for complete search history.

(56) References Cited

U.S. PATENT DOCUMENTS 7,227,738 B2 * 6/2007 Takeda ................. H01G 9/028
252/62.2
2009/0147443 A1 6/2009 Honda et al.

FOREIGN PATENT DOCUMENTS

| CN | 1708817 | 12/2005 |
|---|---|---|
| CN | 101512693 | 8/2009 |
| JP | 08-067672 | 3/1996 |
| JP | 2964244 | 10/1999 |
| JP | 11-322720 | 11/1999 |
| JP | 2004-165187 | 6/2004 |
| JP | 2005-311139 | 11/2005 |
| JP | 2006-327956 | 12/2006 |
| JP | 2013222866 | 10/2013 |
| TW | I307106 | 3/2009 |
| WO | 95/15572 | 6/1995 |

OTHER PUBLICATIONS

International Preliminary Report on Patentability; this report contains the following items :Form PCT/IB/373, PCT/ISA237(cover sheet), PCT/ISA237(Box No. I),PCT/ISA237(Box No. V), mailed on Oct. 28, 2014, which is English translation of "Written Opinion of the International Searching Authority", p. 1-p. 6.
"The Extended European Search Report", issued on Jul. 23, 2015, pp. 1-6, in which the listed reference was cited.
"International Search Report (Form PCT/ISA/210)", mailed on Jul. 16, 2013, pp. 1-2, in which two of the listed references (JP2004-165187 and JP2005-311139) were cited.
"Office Action of Taiwan Counterpart Application" with English translation, issued on Aug. 31, 2016, p. 1-p. 7.
"Office Action of Japan Counterpart Application", issued on Feb. 21, 2017, with English translation thereof, p1-p6.
"Office Action of China Counterpart Application", issued on Feb. 3, 2017, with English translation thereof, p1-p12.
"Office Action of European Counterpart Application", issued on Mar. 15, 2017, p1-p4.

\* cited by examiner

*Primary Examiner* — Carol M Koslow
(74) *Attorney, Agent, or Firm* — Jianq Chyun IP Office

(57) ABSTRACT

In order to render an electrolytic solution not leak from a sealed part even at a higher temperature of the environment or in a high-humidity condition to enhance the reliability of an electrolytic capacitor, an electrolytic solution for an aluminum electrolytic capacitor is described. The electrolytic solution includes an aprotic solvent (A), an electrolyte (D) containing a salt composed of a cation (B) represented by formula (1) and an anion (C), and a compound (E) represented by formula (2) and having a content of 0.01 to 3 wt % relative to the total weight of (A) and (D):

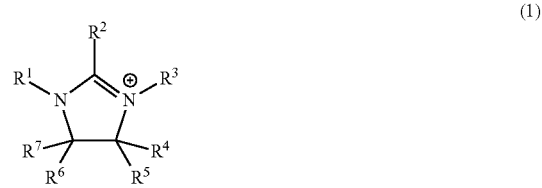

(1)

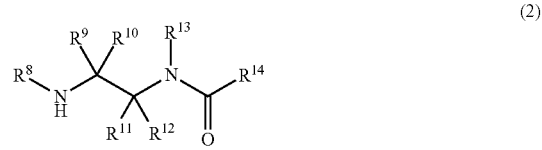

(2)

wherein in formulae (1) and (2), $R^1$ to $R^3$ are each $C_{1-3}$ alkyl, $R^4$ to $R^7$ are each $C_{1-3}$ alkyl or a hydrogen atom, and $R^8$ to $R^{14}$ are each $C_{1-3}$ alkyl or a hydrogen atom.

5 Claims, No Drawings

ELECTROLYTIC SOLUTION FOR ALUMINUM ELECTROLYTIC CAPACITOR, AND ALUMINUM ELECTROLYTIC CAPACITOR USING SAME

CROSS-REFERENCE TO RELATED APPLICATION

This application is a 371 application of an international PCT application serial no. PCT/JP2013/002606 filed on Apr. 17, 2013, which claims the priority benefits of Japan application no. 2012-101133 filed on Apr. 26, 2012. The entirety of each of above-mentioned patent applications is hereby incorporated by reference herein and made a part of this specification.

FIELD OF THE INVENTION

The invention relates to an electrolytic solution for an aluminum electrolytic capacitor, and an aluminum electrolytic capacitor using the same.

DESCRIPTION OF THE RELATED ART

In recent years, as the temperature of the environment gets higher, aluminum electrolytic capacitors for use in automotive electrical equipment are desired to exhibit little characteristic degradation at high temperature. Also, due to their exposure in the open air, the aluminum electrolytic capacitors are desired to exhibit little characteristic degradation even in a high-humidity condition. Hence, the electrolytic solutions are also desired to exhibit little characteristic degradation in a high-temperature and high-humidity environment.

Conventionally, an electrolytic solution including a carboxylate salt of a quaternized product of a compound containing an alkyl-substituted amidine group as an electrolyte, namely an amidine-based electrolytic solution (see Patent Document 1, for example), or the like is known as an electrolytic solution for an aluminum electrolytic capacitor with high durability.

PRIOR-ART DOCUMENTS

Patent Documents

Patent Document 1: International Patent Publication No. WO 95/15572

SUMMARY OF THE INVENTION

Problems to be Solved by the Invention

Prior to the amidine-based electrolytic solution, quaternary alkylammonium-based electrolytic solution has been used. However, a defect of the same is that the electrolytic solution may leak from a sealed part that has deteriorated due to alkali. On the other hand, the amidine-based electrolytic solution of Patent Document 1 reacts with an alkali generated by the compound containing the alkyl-substituted amidine group. Hence, deterioration of a sealing member caused by alkali is suppressed, and the electrolytic solution is prevented from leaking from the sealed part. In this way, with the effect not achieved by the quaternary alkylammonium-based electrolytic solution, the amidine-based electrolytic solution is widely used as an electrolytic solution for aluminum electrolytic capacitors. Nevertheless, at a higher temperature of the environment or in a high-humidity condition, the efficiency of suppression of alkali-caused deterioration is not always sufficient.

An issue of the invention is to render the electrolytic solution not leak from a sealed part even at a higher temperature of the environment or in a high-humidity condition to enhance the reliability of the electrolytic capacitor.

Means for Solving the Problems

As a result of investigation for achieving the above object, the present inventors have attained the invention.

The invention relates to an electrolytic solution for an aluminum electrolytic capacitor, including an aprotic solvent (A), an electrolyte (D) containing a salt composed of a cation (B) represented by formula (1) and an anion (C), and a compound (E) represented by formula (2) and having a content of 0.01 to 3 wt % relative to the total weight of (A) and (D).

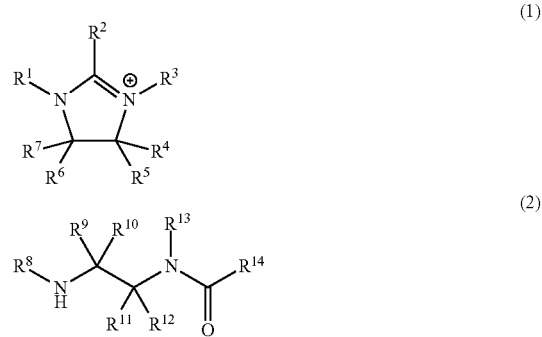

In formula (1), $R^1$ to $R^3$ are each $C_{1-3}$ alkyl, and $R^4$ to $R^7$ are each $C_{1-3}$ alkyl or a hydrogen atom. In formula (2), $R^8$ to $R^{14}$ are each $C_{1-3}$ alkyl or a hydrogen atom.

Effects of the Invention

An electrolytic capacitor using the electrolytic solution of the invention can be made a highly reliable capacitor free from leakage of electrolytic solution through a sealed part even at a higher temperature of the environment or in a high-humidity condition.

DESCRIPTION OF THE EMBODIMENTS

In the electrolytic solution of the invention, when a voltage is applied thereto, $OH^-$ is generated at a cathode side and $H^+$ is generated at an anode side as a result of electrolysis of water contained in the electrolytic solution. $H^+$ reacts with the compound (E) represented by formula (2) to form an amine salt. The amine salt neutralizes $OH^-$ and thus exhibits an effect of suppressing alkali. Hence, even if the capacitor is used at high temperature and high humidity, due to the effect of the compound (E), deterioration of a sealing member caused by alkali is unlikely to occur, and leakage of the electrolytic solution from a sealed part can be suppressed. The cation (B) is a quaternized product of a compound containing an alkyl-substituted amidine group and is represented by formula (1). When the cation (B) is combined with the compound (E), an electrolytic solution for capacitor having a high reliability even at high temperature and high humidity is produced.

<Aprotic Solvent (A)>

Examples of the aprotic solvent (A) in the electrolytic solution of the invention include: 1) an ether, 2) an amide, 3) an oxazolidinone, 4) a lactone, 5) a nitrile, 6) a carbonate, 7) a sulfone, and 8) other organic solvents.

1) Ether:

Examples thereof include: monoethers, such as ethylene glycol monobutyl ether, ethylene glycol monophenyl ether, tetrahydrofuran, and 3-methyltetrahydrofuran, etc.; diethers, such as ethylene glycol dimethyl ether, ethylene glycol diethyl ether, diethylene glycol monomethyl ether, and diethylene glycol monoethyl ether, etc.; and triethers, such as diethylene glycol dimethyl ether, and diethylene glycol diethyl ether, etc.

2) Amide:

Examples thereof include: formamides, such as N-methylformamide, N,N-dimethyl-formamide, N-ethylformamide, and N,N-diethylformamide, etc.; acetamides, such as N-methylacetamide, N,N-dimethylacetamide, N-ethylacetamide, and N,N-diethylacetamide, etc.; propionamides, such as N,N-dimethylpropionamide, etc.; pyrrolidones, such as N-methylpyrrolidone, and N-ethylpyrrolidone, etc.; and hexamethyl phosphoryl amide, etc.

3) Oxazolidinone:

Examples thereof include N-methyl-2-oxazolidinone, 3,5-dimethyl-2-oxazolidinone, etc.

4) Lactone:

Examples thereof include: γ-butyrolactone, α-acetyl-γ-butyrolactone, β-butyrolactone, γ-valerolactone, and δ-valerolactone, etc.

5) Nitrile:

Examples thereof include: acetonitrile, propionitrile, butyronitrile, acrylonitrile, methacrylonitrile, and benzonitrile, etc.

6) Carbonate:

Examples thereof include: ethylene carbonate, propylene carbonate, butylene carbonate, dimethyl carbonate, and diethyl carbonate, etc.

7) Sulfone:

Examples thereof include: sulfolane, and dimethyl sulfone, etc.

8) Other Organic Solvents:

Examples thereof include: 1,3-dimethyl-2-imidazolidinone, dimethyl sulfoxide, aromatic solvents (toluene, xylene, etc.), and paraffin solvents (normal paraffin, isoparaffin, etc.), etc.

These aprotic solvents (A) may be used alone or in combination of two or more. Among them, lactone and sulfone are preferred, γ-butyrolactone and sulfolane are more preferred, and γ-butyrolactone is particularly preferred.

The electrolytic solution of the invention may also contain, in addition to the aprotic solvent (A), a protic solvent (F) such as ethylene glycol or the like. The content of (F) is 0 to 100 weight percent (hereinafter sometimes referred to as wt %) based on the weight of (A). Examples of (F) include ethylene glycol, propylene glycol, and diethylene glycol, etc.

<Cation (B)>

The electrolyte (D) contained in the electrolytic solution of the invention contains a salt composed of the cation (B) represented by formula (1) and the anion (C).

In formula (1), $R^1$ to $R^3$ are each $C_{1-3}$ alkyl, and $R^4$ to $R^7$ are each $C_{1-3}$ alkyl or a hydrogen atom. Examples of the $C_{1-3}$ alkyl include: methyl, ethyl, n-propyl and isopropyl.

Specific examples of the cation (B) include: 1,2,3,4-tetramethylimidazolinium, 1,3,4-trimethyl-2-ethylimidazolinium, 1,3-dimethyl-2,4-diethylimidazolinium, 1,2-dimethyl-3,4-diethylimidazolinium, 1-methyl-2,3,4-triethylimidazolinium, 1,2,3,4-tetraethyl-imidazolinium, 1,2,3-trimethylimidazolinium, 1,3-dimethyl-2-ethylimidazolinium, 1-ethyl-2,3-dimethylimidazolinium, and 1,2,3-triethylimidazolinium, etc.

Among the above examples, 2,3,4-tetramethylimidazolinium and 1-ethyl-2,3-dimethylimidazolinium are more preferred.

<Anion (C)>

Examples of the anion (C) in the electrolytic solution of the invention include the anions of various organic acids and/or inorganic acids commonly used in electrolytic solutions. In the case of an organic acid and/or inorganic acid having a valence of two or more, the anion (C) is preferably a monoanion.

The organic acid and inorganic acid are exemplified by the following items 1) to 6).

1) Carboxylic Acids $C_{2-15}$ polycarboxylic acid having a valence of 2 to 4:
Examples thereof include: aliphatic polycarboxylic acids, such as saturated polycarboxylic acids (such as oxalic acid, malonic acid, succinic acid, glutaric acid, adipic acid, pimelic acid, suberic acid, azelaic acid, and sebacic acid, etc.), and unsaturated polycarboxylic acids (such as maleic acid, fumaric acid, and itaconic acid, etc.); aromatic polycarboxylic acids, such as phthalic acid, isophthalic acid, terephthalic acid, trimellitic acid, and pyromellitic acid, etc.; and S-containing polycarboxylic acids, such as thiodipropionic acid, etc.

$C_{2-20}$ hydroxycarboxylic acid: Examples thereof include: aliphatic hydroxycarboxylic acids, such as glycolic acid, lactic acid, tartaric acid, and castor oil fatty acid, etc.; and aromatic hydroxycarboxylic acid, such as salicylic acid, and mandelic acid, etc.

$C_{1-30}$ monocarboxylic acid: Examples thereof include: aliphatic monocarboxylic acids, such as saturated monocarboxylic acids (such as formic acid, acetic acid, propionic acid, butyric acid, isobutyric acid, valeric acid, caproic acid, enanthic acid, caprylic acid, pelargonic acid, lauric acid, myristic acid, stearic acid and behenic acid, etc.), and unsaturated monocarboxylic acids (such as acrylic acid, methacrylic acid, crotonic acid and oleic acid, etc.); and aromatic monocarboxylic acids, such as benzoic acid, cinnamic acid, and naphthoic acid, etc.

2) Phenols

Monohydric phenol (including phenols and naphthols): Examples thereof include: phenol, alkyl ($C_{1-15}$) phenols (such as cresol, xylenol, ethylphenol, n- or iso-propylphenol, and isododecylphenol, etc.), methoxyphenols (such as eugenol, and guaiacol, etc.), α-naphthol, β-naphthol, and cyclohexylphenol, etc.

Polyhydric phenol: Examples thereof include: catechol, resorcin, pyrogallol, phloroglucin, bisphenol A, bisphenol F, and bisphenol S, etc.

3) Mono- and di-alkyl phosphates containing $C_{1-15}$ alkyl:

Examples thereof include mono- and di-methyl phosphates, mono- and di-ethyl phosphates, mono- and di-isopropyl phosphates, mono- and di-butyl phosphates, mono- and di-(2-ethylhexyl) phosphates, mono- and di-isodecyl phosphates, etc.

4) Sulfonic Acid:

Examples thereof include: alkyl ($C_{1-15}$) benzenesulfonic acid (p-toluenesulfonic acid, nonylbenzenesulfonic acid, and dodecylbenzenesulfonic acid, etc.), sulfosalicylic acid, methanesulfonic acid, and trifluoromethanesulfonic acid, etc.

5) Inorganic Acid:

Examples thereof include: phosphoric acid, tetrafluoroboric acid, perchloric acid, hexafluorophosphoric acid, hexafluoroantimonic acid, and hexafluoroarsenic acid, etc.

6) Others:

Examples thereof include imide anion of trifluoromethane sulfonylimide or the like, and methide anion of trifluoromethane sulfonylmethide or the like.

Among them, 1) carboxylic acids and 3) mono- and di-alkyl phosphates (containing $C_{1-15}$ alkyl) are preferred, mono- and di-ethyl phosphates, mono- and di-isopropyl phosphates, mono- and di-butyl phosphates, phthalic acid and maleic acid are more preferred, and phthalic acid and maleic acid are even more preferred.

<Electrolyte (D)>

The electrolyte (D) in the electrolytic solution of the invention is represented by a combination of the cation (B) and the anion (C), and is preferably one from the followings: 1,2,3,4-tetramethylimidazolinium/phthalate monoanion, 1-ethyl-2,3-dimethylimidazolinium/phthalate monoanion, 1,2,3,4-tetramethylimidazolinium/maleate monoanion, 1-ethyl-2,3-dimethylimidazolinium cation/maleate monoanion, 1,2,3,4-tetramethylimidazolinium/diethylphosphate anion, 1-ethyl-2,3-dimethylimidazolinium cation/diethylphosphate anion, 1,2,3,4-tetramethylimidazolinium/dibutylphosphate anion, 1-ethyl-2,3-dimethyl-imidazolinium cation/dibutylphosphate anion, 2,3,4-tetramethylimidazolinium/diisopropylphosphate anion, and 1-ethyl-2,3-dimethylimidazolinium cation/diisopropylphosphate anion.

Further, the following combinations are even more preferred:

1,2,3,4-tetramethylimidazolinium/phthalate monoanion, 1-ethyl-2,3-dimethyl-imidazolinium/phthalate monoanion, 2,3,4-tetramethylimidazolinium/maleate monoanion, and 1-ethyl-2,3-dimethylimidazolinium cation/maleate monoanion.

The electrolytic solution for an aluminum electrolytic capacitor of the invention includes the electrolyte (D) as a main electrolyte. Herein, the expression of "includes . . . as a main electrolyte" means that the electrolyte (D) accounts for 50 wt % or more of the electrolyte contained in the electrolytic solution for an electrolytic capacitor of the invention.

The electrolytic solution for an aluminum electrolytic capacitor of the invention may also include, in addition to the electrolyte (D), an electrolyte (G). The content of (G) is less than 50 wt % of the electrolyte contained in the electrolytic solution for an electrolytic capacitor of the invention. Examples of the electrolyte (G) include triethylamine phthalate, ethyldimethylamine phthalate, diethylmethylamine phthalate, triethylamine maleate, ethyldimethylamine maleate, and diethylmethylamine maleate, etc.

<Compound (E)>

The compound (E) in the electrolytic solution of the invention is represented by formula (2), and specific examples thereof are described below. These compounds (E) may be used alone or in combination of two or more.

The examples are: N-methyl-N-[2-(N'-methylamino)propyl]acetamide, N-methyl-N-[2-(N'-methylamino)-1-methyl ethyl]acetamide, N-methyl-N-[2-(N'-ethylamino)ethyl]-acetamide, N-ethyl-N-[2-(N'-methylamino)ethyl]acetamide, N-methyl-N-[2-(N'-methyl-amino)ethyl]acetamide, N-methyl-N-[2-(N'-ethylamino)propyl]acetamide, N-ethyl-N-[2-(N'-methylamino)-1-methyl ethyl]acetamide, and N-methyl-N-[2-(N'-methylamino)-ethyl]propionamide, etc.

Among them, N-methyl-N-[2-(N'-methylamino)propyl] acetamide, N-methyl-N-[2-(N'-methylamino)-1-methyl ethyl]acetamide, N-methyl-N-[2-(N'-ethylamino)ethyl]acetamide, and N-ethyl-N-[2-(N'-methylamino)ethyl]acetamide are preferred.

The content of the compound (E) is 0.01 to 3 wt % relative to the total weight of the aprotic solvent (A) and the electrolyte (D). Further, the content is preferably 0.1 to 2 wt %, and more preferably 1 to 1.5 wt %. If the content is less than 0.01 wt %, the effect of suppressing the deterioration of a sealing member caused by alkali is lowered; if the content exceeds 3 wt %, the heat resistance of the electrolytic solution of the invention is reduced.

The content of the compound (E) can be determined by high performance liquid chromatography (HPLC).

The HPLC measurement conditions include: a column filled with a polymer-coated filler, a phosphate buffer solution (pH is 2 to 3) as a mobile phase, a flow rate of 0.8 ml/min, a UV detector, and a temperature of 40° C. In addition, the electrolytic solution 100-fold diluted in the mobile phase serves as a sample for measurement.

The following methods are known as methods for synthesizing the electrolyte (D): a method in which secondary and tertiary cyclic amidines are converted into quaternary form with alkyl halide, dialkyl sulfate or the like and subsequently anion-exchanged with organic acid salts of alkali metals or alkaline earth metals, a method (Japanese Unexamined Patent Application Publication No. Hei 8-67672) in which quaternization is made with a carbonic acid diester to form a carbonate and the resultant is subject to anion exchange with an organic acid, a method (Japanese Unexamined Patent Application Publication No. Hei 11-322720) in which an amide compound of a disubstituted diamine reacts with an organic acid, and so on.

The following methods are known as methods for synthesizing the compound (E): a method (Japanese Patent No. 2964244) in which a diamine monoamide or monosubstituted diamine monoamide reacts with alkyl halide, dialkyl sulfate or the like to form a halide salt or a sulfate salt of di-substituted diamine monoamide and the resultant is subject to an alkaline treatment to obtain the compound (E) by distillation, or a method (Japanese Unexamined Patent Application Publication No. 2006-327956) in which an organic dihalide reacts with a mono alkylamine, or a diamine compound reacts with an alkylating agent, to produce a di-substituted diamine, and then the di-substituted diamine reacts with an organic acid or an organic acid ester to subsequently obtain the compound (E) by distillation, and so on.

Furthermore, the electrolytic solution of the invention preferably contains 4-methoxybutyric acid, which also reacts with a strong alkali component that is formed from electrolysis of the electrolytic solution when a voltage is applied, and the reactant dissolves in the electrolytic solution. Therefore, even when the electrolytic solution is used at high temperature and high humidity, deterioration of a sealing member caused by alkali is unlikely to occur, and leakage of the electrolytic solution from a sealed part can be suppressed.

The content of 4-methoxybutyric acid based on the total weight of (A) and (D) is preferably 0.1 wt % or less, more preferably 0.001 to 0.1 wt %, and even more preferably 0.005 to 0.05 wt %.

The content of 4-methoxybutyric acid can be obtained by gas chromatography (GC).

The electrolytic solution of the invention has a pH of normally 3 to 12, and preferably 6 to 11. The conditions for producing the electrolyte (D) are selected such that the pH of the electrolytic solution falls in this range. Moreover, the pH of the electrolytic solution is a value measured on an undiluted solution of the electrolytic solution at 25° C.

If necessary, water may be added to the electrolytic solution of the invention, in 10 wt % or less based on the weight of the electrolytic solution if in view of heat resistance.

If necessary, various additives commonly used for electrolytic solutions can be added to the electrolytic solution of the invention. Examples thereof include: phosphoric acid derivatives, such as phosphoric acid, and phosphate esters, etc.; boric acid derivatives, such as boric acid, complex compounds of boric acid with polysaccharides (e.g., mannite, and sorbit, etc.), and complex compounds of boric acid with polyhydric alcohols (e.g., ethylene glycol, and glycerol, etc.), etc.; nitro compounds (e.g., o-nitrobenzoic acid, p-nitrobenzoic acid, m-nitrobenzoic acid, o-nitrophenol, and p-nitrophenol, etc.), etc. In view of electrical conductivity of the electrolyte (D) and its solubility in a solvent of the electrolytic solution, an amount of the additive is 10 wt % or less based on the weight of the electrolytic solution.

EXAMPLES

Specific examples of the invention are described hereinafter, but the invention is not limited thereto. In the followings, the term "part" refers to "weight part."

Preparation Example 1

Ethyl acetate (0.1 mol) and 1,2-diaminopropane (0.1 mol) were prepared and maintained at a temperature of 140 to 180° C. and a pressure of 0 to 0.1 MPa for 6 hours, and an amidation reaction was conducted. Next, reduced-pressure distillation was conducted at a temperature of 110 to 150° C. to obtain 2,4-dimethylimidazoline. Next, the obtained 2,4-dimethylimidazoline (0.1 mol) was dripped in a methanol solution (74 wt %) of dimethyl carbonate (0.2 mol) and stirred at 120° C. for 15 hours to obtain a methanol solution of 1,2,3,4-tetramethylimidazolinium methylcarbonate salt.

Phthalic acid (0.1 mol) was added to the methanol solution of 1,2,3,4-tetramethylimidazolinium methylcarbonate salt (0.1 mol) to obtain a methanol solution of 1,2,3,4-tetramethylimidazolinium/phthalate monoanion. The resulting solution was heated under a reduced pressure of 1.0 kPa or less at 50° C. to distill methanol until no distillation of methanol was observed. Then, the temperature was raised from 50° C. to 100° C., and the heating was continued for 30 min to distill monomethyl carbonate ($HOCO_2CH_3$), methanol and carbon dioxide (small amounts of methanol and carbon dioxide are formed by thermal decomposition of monomethyl carbonate, which are hereinafter abbreviated as by-products) to obtain an electrolyte (D-1) (1,2,3,4-tetramethylimidazolinium phthalate monoanion). The yield was 99 wt %, based on the weight of the 1,2,3,4-tetramethylimidazolinium methylcarbonate salt (0.1 mol) (the same rule applies hereinafter).

Preparation Example 2

A salt exchange reaction was carried out by adding maleic acid (0.1 mol) to a methanol solution of 1,2,3,4-tetramethylimidazolinium methylcarbonate salt (0.1 mol) prepared in the same manner of Preparation Example 1 to obtain a methanol solution of 1,2,3,4-tetramethylimidazolinium/maleate monoanion. The resulting solution was heated under a reduced pressure of 1.0 kPa or less at 50° C. to distill methanol until no distillation of methanol was observed. Then, the temperature was raised from 50° C. to 100° C., and the heating was continued for 30 min to distill the by-products, thereby obtaining an electrolyte (D-2) (1,2,3,4-tetramethylimidazolinium/maleate monoanion).

Preparation Example 3

Diethyl carbonate (0.1 mol) and 2-methylimidazoline (produced by Shikoku Chemicals Corporation; 0.1 mol) were prepared and stirred at a temperature of 100 to 150° C. for 10 hours to obtain 1-ethyl-2-methylimidazoline. The obtained 1-ethyl-2-methylimidazoline (0.1 mol) was dripped in a methanol solution (74 wt %) of dimethyl carbonate (0.1 mol) and stirred at 120° C. for 15 hours to obtain a methanol solution of 1-ethyl-2,3-dimethylimidazolinium methylcarbonate salt.

Phthalic acid (0.1 mol) was added to the obtained methanol solution of 1-ethyl-2,3-dimethylimidazolinium methylcarbonate salt (0.1 mol) to obtain a methanol solution of 1-ethyl-2,3-dimethylimidazolinium phthalate monoanion. The resulting solution was heated under a reduced pressure of 1.0 kPa or less at 50° C. to distill methanol until no distillation of methanol was seen. Then, the temperature was raised from 50° C. to 100° C., and the heating was continued for 30 min to distill monomethyl carbonate ($HOCO_2CH_3$) and the by-products to obtain an electrolyte (D-3) (1-ethyl-2,3-dimethylimidazolinium/phthalate monoanion).

Preparation Example 4

Diethylamine (0.2 mol) was added to triethyl phosphate (0.1 mol), and the resultant was heated at 125° C. for 40 hours to prepare diethyl phosphate monoanion/diethylamine cation salt. The resultant was added to a methanol solution of 1,2,3,4-tetramethylimidazolinium methylcarbonate salt (0.1 mol) for a salt exchange reaction to obtain a methanol solution of 1,2,3,4-tetramethylimidazolinium diethyl phosphate monoanion. The resulting solution was heated under a reduced pressure of 1.0 kPa or less at 135° C. until no distillation of methanol or amines such as diethylamine was observed, thereby obtaining an electrolyte (D-4) (1,2,3,4-tetramethylimidazolinium/diethyl phosphate monoanion).

Preparation Example 5

N-methyl-N—(N'-methyl-2-aminopropyl)acetamide (0.1 mol) and phthalic acid (0.1 mol) were placed in a reaction vessel made of SUS having a thermometer, a device capable of performing depressurization dehydration and a stirrer, and reacted with each other at a reaction temperature of 100° C. for 6 hours. Then, unreacted substances and water produced as by-products were distilled at 120° C. under a reduced pressure of 0.5 kPa, thereby obtaining an electrolyte (D-5) (1,2,3,4-tetramethylimidazolinium/phthalate monoanion).

Preparation Example 6

Sodium hydroxide (0.2 mol) was added to 1,2-dichloropropane (0.1 mol), followed by blowing in methylamine (0.2 mol). Then, the vessel was sealed and heated at 80° C. for 10 hours. Then, distillation was carried out to obtain a secondary diamine. The secondary diamine and ethyl acetate were placed in a sealed vessel and reacted with each other at 170° C. for 10 hours, followed by distillation, to obtain a mixture of N-methyl-N-[2-(N'-methyl-amino)propyl]acetamide (E-1) and N-methyl-N-[2-(N'-methylamino)-1-methylethyl]-acetamide (E-2). The mixture was subjected to separation using a liquid chromatograph to obtain N-methyl-N-[2-(N'-methylamino)propyl]acetamide (E-1) and N-methyl-[2-(N'-methylamino)-1-methylethyl]acetamide (E-2).

Preparation Example 7

The 1,2-dichloropropane (0.1 mol) of Preparation Example 4 was replaced by 1,2-dichloroethane and the methylamine (0.2 mol) replaced by methylamine (0.1 mol) and ethylamine (0.1 mol), thereby obtaining N-methyl-N-[2-(N'-ethylamino)ethyl]acetamide (E-3) and N-ethyl-N-[2-(N'-methylamino)ethyl]acetamide (E-4).

In the followings, a substance obtained by subjecting a commercially available γ-butyrolactone (by Tokyo Chemical Industry Co., Ltd.) to distillation at 120° C. at a reduced pressure of 10 kPa to remove water and impurities is referred to as "refined γ-butyrolactone."

In the followings, a substance obtained by subjecting a commercially available sulfolane (by Sumitomo Seika Chemicals Company, Limited) to distillation at 120° C. at a reduced pressure of 0.7 kPa to remove water and impurities is referred to as "refined sulfolane."

By using the electrolytes (D-1) to (D-5) obtained by the above Preparation Examples 1 to 5, the compounds (E-1) to (E-4) obtained by the above Preparation Examples 6 and 7, the refined γ-butyrolactone, the refined sulfolane and 4-methoxybutyric acid (by Nacalai Tesque), electrolytic solutions of Examples 1 to 15 and Comparative Examples 1 to 5 shown in Table 1 were prepared.

The contents of the compound (E) and the 4-methoxybutyric acid were confirmed to be the numerical values mentioned in the table under the following measurement conditions.

Quantitative Determination of Compound (E)

The determination was performed under the measurement conditions below: a machine of HPLC LC-10A made by Shimazdu Corporation, a CAPCELL PACK-type column UG120 (4.6 mmφ×25 cm) made by Shiseido Company, a mobile phase being an aqueous solution of phosphoric acid in a concentration of 10 mmol/l and sodium perchlorate in a concentration of 100 mmol/l, a flow rate of 0.8 ml/min, a detector of UV (210 nm) type, an injection volume of 20 and a column temperature of 40° C. In addition, the electrolytic solution 100-fold diluted in the mobile phase served as a sample for measurement. A standard curve was created using the compound (E).

Quantitative Determination of 4-Methoxybutyric Acid

The determination was performed under the measurement conditions below: a machine of gas chromatography GC-2010 made by Shimazdu Corporation, the capillary column DBWAX (length: 30 m; ID: 0.53 mm) made by J&W Scientific Inc. or the capillary column ZB-WAX plus (length: 30 m, ID: 0.25 mm) made by Phenomenex, a detector of FID type or GCMS-QP2010, a carrier gas of helium, a vaporizing chamber temperature of 200° C., a detector temperature of 250° C., a column temperature raised from an initial temperature of 40° C. to 200° C. at a rate of 10° C./min and then maintained for 10 min, and an injection volume of 1 μl. A standard curve was created using 4-methoxybutyric acid.

Regarding the electrolytic solutions of Examples 1 to 15 and Comparative Examples 1 to 5, after a heat-resistance test was carried out at 130° C. for 1000 hours in a sealed SUS (stainless steel) vessel, a ratio of change in electrical conductivity defined by the following equation was shown in Table 1.

Ratio of change (%) in electrical conductivity=100× ([electrical conductivity before the heat-resistance test]−[electrical conductivity after the heat-resistance test])/[electrical conductivity before the heat-resistance test]

By using the electrolytic solutions of Examples 1 to 15 and Comparative Examples 1 to 5, winding-type aluminum electrolytic capacitors (rated voltage: 6.3 V; electrostatic capacity: 220 μF; size: φ6.5 mm×L4.5 mm) were produced. Peroxide-vulcanized butyl rubber was used as sealing rubber. A rated voltage was applied to the produced aluminum electrolytic capacitor, and after 3000 hours, the state of a sealing member was observed. The temperature/humidity conditions included the following three conditions: Condition A (105° C./85%), Condition B (130° C./85%), and Condition C (140° C./85%).

[Table 1] (See Next Page)

It is clear that compared to Comparative Examples 1 to 5, almost no liquid leakage occurs in Examples 1 to 15. In addition, Examples 1 to 15 have an excellent ratio of change in electrical conductivity.

INDUSTRIAL APPLICABILITY

By using the electrolytic solution of the invention, leakage of the electrolytic solution from a sealed part does not occur even at a higher temperature of the environment or in a high-humidity condition, thereby enhancing the reliability of the electrolytic capacitor. The electrolytic solution of the invention is particularly useful in automotive applications in which the environment easily reaches a high temperature and high humidity.

TABLE 1

| | Non-aqueous solvent (A) | | | Electrolyte (D) | | | | Compound (E) | | | 4-methoxy-butyric acid content (wt %) | State of sealing member | | | Ratio of change (%) in electrical conductivity |
|---|---|---|---|---|---|---|---|---|---|---|---|---|---|---|---|
| | | | Amount added (part) | | | | Amount added (part) | | | Content (wt %) | | Condition A | Condition B | Condition C | |
| | Type | Type | | Type | Cation (B) | Anion (C) | | Type | Compound | | | | | | |
| Example 1 | A-1 | Refined γ-butyrolactone | 75 | D-1 | 1,2,3,4-tetramethyl-imidazolinium cation | Phthalate monoanion | 25 | E-1 | N-methyl-N-[2-(N'-methyl-amino)propyl]acetamide | 1 | — | Nothing abnormal | Nothing abnormal | One small leakage | 8 |
| Example 2 | A-1 | Refined γ-butyrolactone | 75 | D-1 | 1,2,3,4-tetramethyl-imidazolinium cation | Phthalate monoanion | 25 | E-1 | N-methyl-N-[2-(N'-methyl-amino)propyl]acetamide | 0.01 | — | Nothing abnormal | Nothing abnormal | One small leakage | 8 |
| Example 3 | A-1 | Refined γ-butyrolactone | 75 | D-1 | 1,2,3,4-tetramethyl-imidazolinium cation | Phthalate monoanion | 25 | E-1 | N-methyl-N-[2-(N'-methyl-amino)propyl]acetamide | 3 | — | Nothing abnormal | Nothing abnormal | One small leakage | 8 |
| Example 4 | A-1 | Refined γ-butyrolactone | 75 | D-2 | 1,2,3,4-tetramethyl-imidazolinium cation | Maleate monoanion | 25 | E-1 | N-methyl-N-[2-(N'-methyl-amino)propyl]acetamide | 1 | — | Nothing abnormal | Nothing abnormal | One small leakage | 9 |
| Example 5 | A-1 | Refined γ-butyrolactone | 75 | D-3 | 1-ethyl-2,3-dimethyl-imidazolinium cation | Phthalate monoanion | 25 | E-1 | N-methyl-N-[2-(N'-methyl-amino)propyl]acetamide | 1 | — | Nothing abnormal | Nothing abnormal | One small leakage | 8 |
| Example 6 | A-2 | Refined sulfolane | 75 | D-1 | 1,2,3,4-tetramethyl-imidazolinium cation | Phthalate monoanion | 25 | E-2 | N-methyl-N-[2-(N'-methyl-amino)-1-methylethyl]acetamide | 1 | — | Nothing abnormal | Nothing abnormal | One small leakage | 8 |
| Example 7 | A-1 | Refined γ-butyrolactone | 75 | D-1 | 1,2,3,4-tetramethyl-imidazolinium cation | Phthalate monoanion | 25 | E-3 | N-methyl-N-[2-(N'-ethyl-amino)ethyl]acetamide | 1 | — | Nothing abnormal | Nothing abnormal | One small leakage | 8 |
| Example 8 | A-1 | Refined γ-butyrolactone | 75 | D-1 | 1,2,3,4-tetramethyl-imidazolinium cation | Phthalate monoanion | 25 | E-4 | N-ethyl-N-[2-(N'-methyl-amino)ethyl]acetamide | 1 | — | Nothing abnormal | Nothing abnormal | One small leakage | 8 |
| Example 9 | A-1 | Refined γ-butyrolactone | 75 | D-1 | 1,2,3,4-tetramethyl-imidazolinium cation | Phthalate monoanion | 25 | E-1 | N-methyl-N-[2-(N'-methyl-amino)propyl]acetamide | 1 | 0.001 | Nothing abnormal | Nothing abnormal | Nothing abnormal | 9 |
| Example 10 | A-1 | Refined γ-butyrolactone | 75 | D-1 | 1,2,3,4-tetramethyl-imidazolinium cation | Phthalate monoanion | 25 | E-1 | N-methyl-N-[2-(N'-methyl-amino)propyl]acetamide | 1 | 0.01 | Nothing abnormal | Nothing abnormal | Nothing abnormal | 9 |

TABLE 1-continued

| | Non-aqueous solvent (A) | | | Electrolyte (D) | | | | | Compound (E) | | | 4-methoxy-butyric acid | | State of sealing member | | | Ratio of change (%) in electrical conductivity |
|---|---|---|---|---|---|---|---|---|---|---|---|---|---|---|---|---|---|
| | Type | Type | Amount added (part) | Type | Cation (B) | | Anion (C) | Amount added (part) | Type | Compound | Content (wt %) | content (wt %) | Condition A | Condition B | Condition C | |
| Example 11 | A-1 | Refined γ-butyrolactone | 75 | D-1 | 1,2,3,4-tetramethyl-imidazolinium cation | | Phthalate monoanion | 25 | E-1 | N-methyl-N-[2-(N'-methyl-amino)propyl]acetamide | 1 | 0.1 | Nothing abnormal | Nothing abnormal | Nothing abnormal | 9 |
| Example 12 | A-1 | Refined γ-butyrolactone | 75 | D-1 | 1,2,3,4-tetramethyl-imidazolinium cation | | Phthalate monoanion | 25 | E-1 | N-methyl-N-[2-(N'-methyl-amino)propyl]acetamide | 1 | 0.0005 | Nothing abnormal | Nothing abnormal | One small leakage | 9 |
| Example 13 | A-1 | Refined γ-butyrolactone | 75 | D-1 | 1,2,3,4-tetramethyl-imidazolinium cation | | Phthalate monoanion | 25 | E-1 | N-methyl-N-[2-(N'-methyl-amino)propyl]acetamide | 1 | 0.2 | Nothing abnormal | Nothing abnormal | Nothing abnormal | 13 |
| Example 14 | A-1 | Refined γ-butyrolactone | 75 | D-4 | 1,2,3,4-tetramethyl-imidazolinium cation | | Diethyl phosphate monoanion | 25 | E-1 | N-methyl-N-[2-(N'-methyl-amino)propyl]acetamide | 1 | — | Nothing abnormal | Nothing abnormal | One small leakage | 11 |
| Example 15 | A-1 | Refined γ-butyrolactone | 75 | D-1 | 1,2,3,4-tetramethyl-imidazolinium cation | | Phthalate monoanion | 25 | E-1, E-2 | N-methyl-N-[2-(N'-methyl-amino)propyl]acetamide/ N-methyl-N-[2-(N'-methyl-amino)-1-methylethyl]acetamide mixture (weight ratio: 1/1). | 1 | — | Nothing abnormal | Nothing abnormal | One small leakage | 8 |
| Comparative Example 1 | A-1 | Refined γ-butyrolactone | 75 | D-1 | 1,2,3,4-tetramethyl-imidazolinium cation | | Phthalate monoanion | 25 | — | — | — | — | Nothing abnormal | Three liquid leakages | Four liquid leakages | 9 |
| Comparative Example 2 | A-1 | Refined γ-butyrolactone | 75 | D-1 | 1,2,3,4-tetramethyl-imidazolinium cation | | Phthalate monoanion | 25 | E-1 | N-methyl-N-[2-(N'-methyl-amino)propyl]acetamide | 0.005 | — | Nothing abnormal | Two liquid leakages | Three liquid leakages | 9 |
| Comparative Example 3 | A-1 | Refined γ-butyrolactone | 75 | D-1 | 1,2,3,4-tetramethyl-imidazolinium cation | | Phthalate | 25 | E-1 | N-methyl-N-[2-(N'-methyl-amino)propyl]acetamide | 5 | — | Nothing | leakages | One small leakage | 18 |
| Comparative Example 4 | A-1 | Refined γ-butyrolactone | 75 | D-4 | 1,2,3,4-tetramethyl-imidazolinium cation | | Diethyl phosphate monoanion | 25 | — | — | — | — | Nothing abnormal | Three liquid leakages | Four liquid leakages | 11 |
| Comparative Example-5 | A-1 | Refined γ-butyrolactone | 75 | D-5 | 1,2,3,4-tetramethyl-imidazolinium cation | | Phthalate monoanion | 25 | — | — | — | — | Nothing abnormal | Three liquid leakages | Four liquid leakages | 9 |

What is claimed is:

1. An electrolytic solution for an aluminum electrolytic capacitor, comprising:
   an aprotic solvent (A),
   an electrolyte (D) containing a salt composed of a cation (B) represented by formula (1) and an anion (C), and
   a compound (E) represented by formula (2) and having a content of 0.01 to 3 wt % relative to a total weight of (A) and (D):

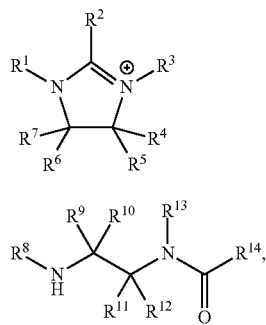

(1)

(2)

wherein
in formula (1), $R^1$ to $R^3$ are each $C_{1-3}$ alkyl, and $R^4$ to $R^7$ are each $C_{1-3}$ alkyl or a hydrogen atom, in formula (2), $R^8$ to $R^{14}$ are each $C_{1-3}$ alkyl or a hydrogen atom, and the anion (C) is carboxylate anion, monoalkyl phosphate anion containing $C_{1-15}$ alkyl, or dialkyl phosphate anion containing $C_{1-15}$ alkyl.

2. The electrolytic solution of claim 1, further comprising 4-methoxybutyric acid in a content of 0.1 wt % or less relative to the total weight of (A) and (D).

3. The electrolytic solution of claim 1, wherein the anion (C) is phthalate monoanion or maleate monoanion.

4. An aluminum electrolytic capacitor comprising the electrolytic solution of claim 1.

5. An automobile comprising the aluminum electrolytic capacitor of claim 4.

* * * * *